United States Patent
Loh et al.

(10) Patent No.: US 9,753,858 B2
(45) Date of Patent: Sep. 5, 2017

(54) DRAM CACHE WITH TAGS AND DATA JOINTLY STORED IN PHYSICAL ROWS

(75) Inventors: Gabriel H. Loh, Bellevue, WA (US); Mark D. Hill, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1091 days.

(21) Appl. No.: 13/307,776

(22) Filed: Nov. 30, 2011

(65) Prior Publication Data
US 2013/0138892 A1 May 30, 2013

(51) Int. Cl.
| G06F 12/00 | (2006.01) |
|---|---|
| G06F 12/0893 | (2016.01) |
| G06F 12/0864 | (2016.01) |
| G06F 12/123 | (2016.01) |
| G06F 12/0879 | (2016.01) |
| G06F 12/0831 | (2016.01) |

(52) U.S. Cl.
CPC ...... *G06F 12/0893* (2013.01); *G06F 12/0864* (2013.01); *G06F 12/0879* (2013.01); *G06F 12/123* (2013.01); *G06F 12/0831* (2013.01); *Y02B 60/1225* (2013.01)

(58) Field of Classification Search
CPC . G06F 12/0893; G06F 12/123; G16F 12/0864
See application file for complete search history.

(56) References Cited

U.S. PATENT DOCUMENTS

| 5,329,489 A | 7/1994 | Diefendorff |
| 5,412,787 A | 5/1995 | Forsyth et al. |
| 5,629,950 A * | 5/1997 | Godiwala ........... G06F 11/1064 711/131 |

(Continued)

FOREIGN PATENT DOCUMENTS

| CN | 101268440 A | 9/2008 |
| EP | 1513062 | 3/2005 |

(Continued)

OTHER PUBLICATIONS

Non-Final Office Action in U.S. Appl. No. 13/532,125, mailed Mar. 27, 2014, 32 pages.

(Continued)

*Primary Examiner* — Charles Rones
*Assistant Examiner* — Nanci Wong
(74) *Attorney, Agent, or Firm* — Rory D. Rankin; Meyertons, Hood, Kivlin, Kowert & Goetzel, P.C.

(57) ABSTRACT

A system and method for efficient cache data access in a large row-based memory of a computing system. A computing system includes a processing unit and an integrated three-dimensional (3D) dynamic random access memory (DRAM). The processing unit uses the 3D DRAM as a cache. Each row of the multiple rows in the memory array banks of the 3D DRAM stores at least multiple cache tags and multiple corresponding cache lines indicated by the multiple cache tags. In response to receiving a memory request from the processing unit, the 3D DRAM performs a memory access according to the received memory request on a given cache line indicated by a cache tag within the received memory request. Rather than utilizing multiple DRAM transactions, a single, complex DRAM transaction may be used to reduce latency and power consumption.

19 Claims, 5 Drawing Sheets

(56) References Cited

U.S. PATENT DOCUMENTS

| | | |
|---|---|---|
| 5,764,946 A | 6/1998 | Tran et al. |
| 5,765,199 A | 6/1998 | Chang et al. |
| 5,784,391 A | 7/1998 | Konigsburg |
| 5,802,594 A | 9/1998 | Wong et al. |
| 5,845,323 A | 12/1998 | Roberts et al. |
| 5,846,323 A | 12/1998 | Egami et al. |
| 5,848,433 A | 12/1998 | Tran et al. |
| 5,974,506 A | 10/1999 | Sicola et al. |
| 6,016,533 A | 1/2000 | Tran |
| 6,038,693 A | 3/2000 | Zhang |
| 6,044,478 A | 3/2000 | Green |
| 6,061,759 A | 5/2000 | Guo |
| 6,073,230 A | 6/2000 | Pickett et al. |
| 6,138,213 A | 10/2000 | Mcminn |
| 6,223,322 B1 | 4/2001 | Michigami et al. |
| 6,256,762 B1 | 7/2001 | Beppu |
| 6,282,644 B1 | 8/2001 | Ko |
| 6,314,514 B1 | 11/2001 | Mcdonald |
| 6,353,910 B1 | 3/2002 | Carnevale et al. |
| 6,493,800 B1 | 12/2002 | Blumrich |
| 6,629,207 B1 | 9/2003 | Yoshioka et al. |
| 6,804,162 B1 | 10/2004 | Eldridge et al. |
| 7,007,210 B2 | 2/2006 | Fields, Jr. et al. |
| 7,117,290 B2 | 10/2006 | Shen et al. |
| 7,620,875 B1 | 11/2009 | Nelson et al. |
| 7,673,216 B2 | 3/2010 | Hino et al. |
| 7,707,463 B2 | 4/2010 | Bartley et al. |
| 7,809,980 B2 | 10/2010 | Refaeli et al. |
| 8,984,368 B2 | 3/2015 | Loh et al. |
| 2001/0034808 A1 | 10/2001 | Nakajima et al. |
| 2003/0065886 A1 | 4/2003 | Olarig et al. |
| 2003/0200395 A1 | 10/2003 | Wicki et al. |
| 2004/0024958 A1 | 2/2004 | Bains et al. |
| 2005/0015553 A1* | 1/2005 | Park .................. G06F 12/0882 711/118 |
| 2005/0050278 A1 | 3/2005 | Meier et al. |
| 2005/0228631 A1 | 10/2005 | Maly et al. |
| 2006/0143390 A1 | 6/2006 | Kottapalli |
| 2007/0079217 A1 | 4/2007 | Haugan et al. |
| 2007/0204107 A1* | 8/2007 | Greenfield .......... G06F 12/0864 711/128 |
| 2007/0220247 A1 | 9/2007 | Lee et al. |
| 2007/0294470 A1* | 12/2007 | Van Dyke ............ G06F 13/161 711/104 |
| 2008/0072120 A1 | 3/2008 | Radke |
| 2008/0235485 A1 | 9/2008 | Haertel et al. |
| 2009/0049245 A1* | 2/2009 | Resnick .............. G06F 12/0897 711/118 |
| 2009/0172449 A1 | 7/2009 | Zhang et al. |
| 2009/0276587 A1 | 11/2009 | Moyer et al. |
| 2010/0250856 A1* | 9/2010 | Owen .................. G06F 12/126 711/128 |
| 2010/0251036 A1 | 9/2010 | Moyer |
| 2012/0159080 A1 | 6/2012 | Donley et al. |
| 2012/0182821 A1 | 7/2012 | Perego |
| 2012/0221785 A1* | 8/2012 | Chung .................... G11C 5/02 711/105 |
| 2012/0297256 A1* | 11/2012 | Plondke et al. ................. 714/54 |
| 2013/0346695 A1 | 12/2013 | Loh et al. |
| 2014/0129767 A1* | 5/2014 | Ramanujan ......... G06F 12/0897 711/105 |

FOREIGN PATENT DOCUMENTS

| | | |
|---|---|---|
| EP | 1612683 | 1/2006 |
| EP | 1862906 | 12/2007 |
| JP | H07311711 A | 11/1995 |
| JP | 2000113668 A | 4/2000 |
| JP | 2000315384 A | 11/2000 |
| WO | 02/091382 | 11/2002 |
| WO | 2008/115400 | 9/2008 |

OTHER PUBLICATIONS

Loh et al., "Efficiently Enabling Conventional Block Sizes for Very Large Die-Stacked DRAM Caches", Proceedings 44th Annual IEEE/ACM International Symposium on Microarchitecture, Dec. 3-7, 2011, pp. 454-464.

Schechter et al., "Use ECP, not ECC, for Hard Failures in Resistive Memories", Proceedings of the 37th Annual Symposium on Computer Architecture, Jun. 19-23, 2010, 12 pages, vol. 38, issue 3, The Association for Computing Machinery, New York, New York.

International Search Report and Written Opinion in International Application No. PCT/US2013/063881, mailed Jan. 8, 2014, 7 pages.

Non-Final Office Action in U.S. Appl. No. 13/649,745, mailed May 7, 2014, 29 pages.

Final Office Action in U.S. Appl. No. 13/649,745, mailed Aug. 25, 2014, 23 pages.

Non-Final Office Action in U.S. Appl. No. 13/532,125, mailed Feb. 25, 2015, 20 pages.

Final Office Action in U.S. Appl. No. 13/532,125, mailed Oct. 20, 2014, 22 pages.

International Search Report and Written Opinion Application No. PCT/US2010/028892 mailed Jul. 6, 2010.

Powell M.D. et al:"Reducing set-associative cache energy via way-prediction and selective direct-mapping" Microarchitecture, 2001. Micro-34. Proceedings. 34th ACM/IEEE International Symposium on Dec. 1-5, 2001, Piscataway, NJ USA., pp. 54-65.

International Search Report and Written Opinion International Application No. PCT/US2012/066217 mailed Mar. 13, 2013; pp. 1-12.

Final Office Action in U.S. Appl. No. 13/532,125, mailed Aug. 27, 2015, 25 pages.

Jiang et al., "CHOP: Adaptive Filter-Based DRAM Caching for CMP Server Platforms", In Proceedings of the 16th International Symposium on High Performance Computer Architecture, Jan. 9-14, 2010, 12 pages.

Dong et al., "Simple but Effective Heterogeneous Main Memory with On-Chip Memory Controller Support", Proceedings of the 2010 ACM/IEEE International Conference for High Performance Computing, Networking, Storage and Analysis, Nov. 13, 2010, 11 pages, IEEE Computer Society, Washington, DC, USA.

Zhao, et al., "Exploring DRAM Cache Architectures for CMP Server Platforms", Proceedings of the 25th International Conference on Computer Design, Oct. 2007, pp. 55-62.

Loh, et al., "Supporting Very Large DRAM Caches with Compound-Access Scheduling and MissMap", IEEE Micro, May 1, 2012, pp. 70-78, IEEE Computer Society Press, Los Alamitos, CA, USA.

Notification of the first Office Action in Chinese Application No. 201280059143.9, mailed May 6, 2016, 18 pages.

Office Action in Japanese Patent Application No. 2014-544789, mailed Nov. 1, 2016, 9 pages.

Notification of the second Office Action in Chinese Application No. 201280059143.9, mailed Nov. 10, 2016, 29 pages.

Notification of the third Office Action in Chinese Application No. 201280059143.9, dated Mar. 8, 2017, 8 pages.

Communication pursuant to Article 94(3) EPC in European Application No. 12795975.7, dated Mar. 28, 2017, 7 pages.

* cited by examiner

DRAM CACHE WITH TAGS AND DATA JOINTLY STORED IN PHYSICAL ROWS

BACKGROUND OF THE INVENTION

Field of the Invention

This invention relates to computing systems, and more particularly, to efficient cache data access in a large row-based memory of a computing system.

Description of the Relevant Art

As both semiconductor manufacturing processes advance and on-die geometric dimensions reduce, semiconductor chips provide more functionality and performance. However, design issues still arise with modern techniques in processing and integrated circuit design that may limit potential benefits. One issue is that interconnect delays continue to increase per unit length in successive generations of two-dimensional planar layout chips. Also, high electrical impedance between individual chips increases latency. In addition, signals that traverse off-chip to another die may significantly increase power consumption for these signals (e.g., by 10 to 100 times) due to the increased parasitic capacitance on these longer signal routes.

Another design issue is that most software applications that access a lot of data are typically memory bound in that computation time is generally determined by memory bandwidth. A memory access latency for an off-chip dynamic random access memory (DRAM) may be hundreds to over a thousand clock cycles, and an increased number of cores in a processor design have accentuated the memory bandwidth problem. Recently, progress has been made in three-dimensional integrated circuits (3D ICs) that include two or more layers of active electronic components integrated both vertically and horizontally into a single circuit. The 3D packaging, known as System in Package (SiP) or Chip Stack multi-chip module (MCM), saves space by stacking separate chips in a single package. Components within these layers communicate using on-chip signaling, whether vertically or horizontally. This signaling provides reduced interconnect signal delay over known two-dimensional planar layout circuits.

The manufacturing trends in the above description may lead to gigabytes of integrated memory within a microprocessor package. In some cases, additional on-chip storage may be used as a row-based memory, such as a last-level cache (LLC) before accessing off-chip memory. A reduced miss rate achieved by the additional memory helps hide the latency gap between a processor and its off-chip memory. However, cache access mechanisms for row-based memories may be inefficient for this additional integrated memory. A large tag data array, such as a few hundred megabytes for a multi-gigabyte cache, may be impractical and expensive to place on the microprocessor die.

Increasing the size of a data cache line for the additional integrated memory, such as growing from a 64-byte line to a 4-kilobyte (KB) line, reduces both a number of cache lines in the integrated memory and the size of a corresponding tag. However, dirty bits and coherency information may still be maintained on a granularity of the original cache line size (64-byte line). In addition, data transfers may consume excessive bandwidth as an entire 4 KB line may be accessed when only a few bytes are targeted.

Utilizing DRAM access mechanisms while storing and accessing the tags and data of the additional cache in the integrated DRAM dissipates a lot of power. In addition, these mechanisms consume a lot of bandwidth, especially for a highly associative on-package cache, and consume too much time as the tags and data are read out in a sequential manner. Therefore, the on-package DRAM provides a lot of extra data storage, but cache and DRAM access mechanisms are inefficient.

In view of the above, efficient methods and systems for efficient cache data access in a large row-based memory of a computing system are desired.

SUMMARY OF EMBODIMENTS OF THE INVENTION

Systems and methods for efficient cache data access in a large row-based memory of a computing system are contemplated.

In one embodiment, a computing system includes a processing unit and an integrated dynamic random access memory (DRAM). Examples of the processing unit include a general-purpose microprocessor, a graphics processing unit (GPU), an accelerated processing unit (APU), and so forth. The integrated DRAM may be a three-dimensional (3D) DRAM and may be included in a System-in-Package (SiP) with the processing unit. The processing unit may utilize the 3D DRAM as a cache.

In various embodiments, the 3D DRAM may store both a tag array and a data array. Each row of the multiple rows in the memory array banks of the 3D DRAM may store one or more cache tags and one or more corresponding cache lines indicated by the one or more cache tags. In response to receiving a memory request from the processing unit, the 3D DRAM may perform a memory access according to the received memory request on a given cache line indicated by a cache tag within the received memory request. Performing the memory access may include a single read of a respective row of the multiple rows storing the given cache line. Rather than utilizing multiple DRAM transactions, a single, complex DRAM transaction may be used to reduce latency and power consumption.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
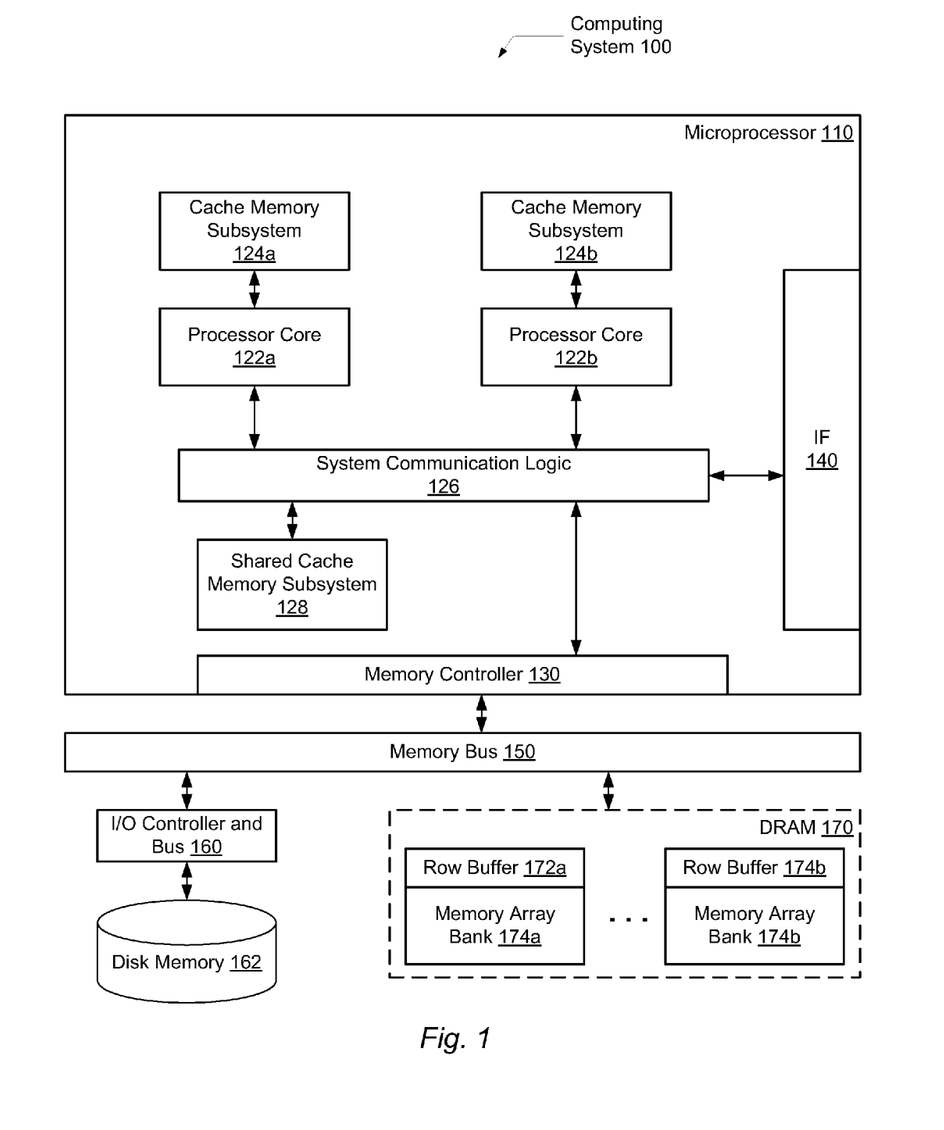
FIG. 1 is a generalized block diagram of one embodiment of a computing system.

Referring to FIG. 1, a generalized block diagram of one embodiment of a computing system 100 is shown. As shown, microprocessor 110 may include one or more processor cores 122*a*-122*b* connected to corresponding one or more cache memory subsystems 124*a*-124*b*. The microprocessor may also include interface logic 140, a memory controller 130, system communication logic 126, and a shared cache memory subsystem 128. In one embodiment, the illustrated functionality of the microprocessor 110 is incorporated upon a single integrated circuit. In another embodiment, the illustrated functionality is incorporated in a chipset on a computer motherboard.

In one embodiment, the microprocessor 110 is a stand-alone system within a mobile computer, a smart phone, or a tablet; a desktop; a server; or other. In one embodiment, system communication logic 116 is a system bus. In another embodiment, the microprocessor 110 incorporates a system bus controller in logic 126 that utilizes one of various protocols to connect the processor cores 122*a*-122*b* to disk memory 162, DRAM 170, peripheral input/output (I/O) devices, other processing units such as another general-purpose microprocessor, which may also be referred to as a central processing unit (CPU); a graphics processing unit (GPU), an accelerated processing unit (APU), a field programmable gate array (FPGA), or other. In such an embodiment, system communication logic 126 may replace or incorporate the functionality of memory controller 130 and interface logic 140.

A further description of the components in the computing system 100 is provided shortly. Although the computing system 100 is shown in one embodiment to include a general-purpose microprocessor 110, in other embodiments used for other purposes, the microprocessor 110 may be replaced with another type of processing unit. Other types of processing units may include a graphics processing unit (GPU), a field programmable gate array (FPGA), or an accelerated processing unit (APU). Generally, an APU is a chip that includes additional processing capability. This additional processing capability may be used to accelerate one or more types of computations outside of a general-purpose CPU. In one embodiment, an APU may include a general-purpose CPU integrated on a same die with a GPU, a FPGA, or other processing unit, thus improving data transfer rates between these units while reducing power consumption. In other embodiments, an APU may include video processing and other application-specific accelerators.

Regardless of a given type of processing unit used in the computing system 100, as software applications access more and more data, the memory subsystem is utilized more heavily. Latencies become more crucial. More on-chip memory storage may be used to reduce interconnect latencies. For example, each of the cache memory subsystems 124*a*-124*b* may reduce memory latencies for a respective one of the processor cores 122*a*-122*b*. In addition, the microprocessor 110 may include the shared cache memory subsystem 128 as a last-level cache (LLC) before accessing the off-chip DRAM 170 and/or the off-chip disk memory 162.

A reduced miss rate achieved by the additional memory provided by the cache memory subsystems 124*a*-124*b* and 128 helps hide the latency gap between a given one of the processor cores 122*a*-122*b* and the off-chip memory. However, there is limited real estate to use for each of the cache memory subsystems 124*a*-124*b* and 128. Therefore, the respective sizes is limited for each of the cache memory subsystems 124*a*-124*b* and 128 and a significant number of accesses are still sent to the off-chip memory, such as the DRAM 170 and/or the disk memory 162.

Continuing with attempts to reduce memory latencies, other technology may be used to provide further on-chip memory storage. Although not shown in FIG. 1, in one embodiment, the microprocessor 110 may utilize three-dimensional integrated circuits (3D ICs) to provide a last-level cache (LLC). Further details of such an embodiment for a computing system are provided later in the descriptions of FIG. 2 and FIG. 3. The 3D integrated DRAM may provide both low-latency interconnects and a significantly large amount of additional on-chip memory storage to reduce off-chip memory accesses. Interface logic within the microprocessor 110 may provide address translations for the 3D integrated DRAM. Control logic within the 3D integrated DRAM may alter typical steps used for access of a given row of multiple rows in multiple memory array banks within the 3D integrated DRAM. Before further describing an embodiment utilizing 3D ICs, a further description of the components in the computing system 100 shown in FIG. 1 is provided.

Each of the processor cores 122*a*-122*b* may include circuitry for executing instructions according to a given instruction set. For example, the x86 instruction set architecture (ISA) may be selected. Alternatively, the Alpha, PowerPC, or any other instruction set architecture may be selected. In one embodiment, each of the processor cores 122*a*-122*b* may include a superscalar, multi-threaded microarchitecture used for processing instructions of a given ISA.

The cache memory subsystems 124*a*-124*b* and 128 may include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block may be varied according to design choice, and may be of any size. In addition, each of the terms "cache tag", "cache line tag", and "cache block tag" is interchangeable.

Each of the cache memory subsystems 124*a*-124*b* and 128 may include a cache memory, or cache array, connected to a corresponding cache controller. The cache memory subsystems 124*a*-124*b* and 128 may be implemented as a hierarchy of caches. Caches located nearer the processor cores 122*a*-122*b* (within the hierarchy) may be integrated into the processor cores 122*a*-122*b*, if desired. This level of the caches may be a level-one (L1) of a multi-level hierarchy. In one embodiment, the cache memory subsystems 124*a*-124*b* each represent L2 cache structures, and the shared cache memory subsystem 128 represents an L3 cache structure. In another embodiment, cache memory subsystems 114 each represent L1 cache structures, and shared cache subsystem 118 represents an L2 cache structure. Other embodiments are possible and contemplated.

Generally, the processor cores 122*a*-122*b* access the cache memory subsystems 124*a*-124*b*, respectively, for data and instructions. As used herein, the term "access" regarding a cache memory subsystem refers to performing a read or a write request operation that may result in a cache hit if the requested data of a corresponding request address resides in the cache. Alternatively, the read or write operation may result in a cache miss if the requested data does not reside in the cache.

If a cache miss occurs, such as a requested block is not found in a respective one of the cache memory subsystems 124a-124b or in the shared cache memory subsystem 128, then a read request may be generated and transmitted to the memory controller 130. The memory controller 130 may translate an address corresponding to the requested block and send a read request to the off-chip DRAM 170 through the memory bus 150. The off-chip DRAM 170 may be filled with data from the off-chip disk memory 162 through the I/O controller and bus 160 and the memory bus 150.

A corresponding cache fill line with the requested block may be conveyed from the off-chip DRAM 170 to a corresponding one of the cache memory subsystems 124a-124b in order to complete the original read or write request. The cache fill line may be placed in one or more levels of caches. In addition, the cache fill line may be placed within a corresponding set within the cache. If there are no available ways within the corresponding set, then typically a Least Recently Used (LRU) algorithm determines which way within the set is to have its data evicted and replaced by the cache fill line data. Typically, allocation refers to storing a cache fill line fetched from a lower level of the cache hierarchy into a way of a particular cache subsequent a cache miss to the particular cache.

The off-chip disk memory 162 may provide a non-volatile, random access secondary storage of data. In one embodiment, the off-chip disk memory 162 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks.

In another embodiment, the off-chip disk memory 162 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may comprise banks of Flash memory.

The off-chip DRAM 170 may be a type of dynamic random-access memory that stores each bit of data in a separate capacitor within an integrated circuit. The capacitor can be either charged or discharged. These two states may be used to represent the two logical values of a bit. The DRAM 170 may utilize a single transistor and a capacitor per bit. Compared to six transistors used in on-chip synchronous RAM (SRAM), the DRAM may reach much higher densities. Unlike HDDs and flash memory, the DRAM 170 may be volatile memory, rather than non-volatile memory. The DRAM 170 may lose its data quickly when power is removed.

The off-chip DRAM 170 may include a multi-channel memory architecture. This type of architecture may increase the transfer speed of data to the memory controller 130 by adding more channels of communication between them. The multi-channel architecture utilizes multiple memory modules and a motherboard and/or a card capable of supporting multiple channels.

In one embodiment, each of the memory modules may each have a same protocol for a respective interface to the memory controller 130. One example of a protocol is a double data rate (DDR) type of protocol. The protocol may determine values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The memory controller 130 may include control circuitry for interfacing to the memory channels and following a corresponding protocol. Additionally, the memory controller 130 may include request queues for queuing memory requests.

Figure 2:
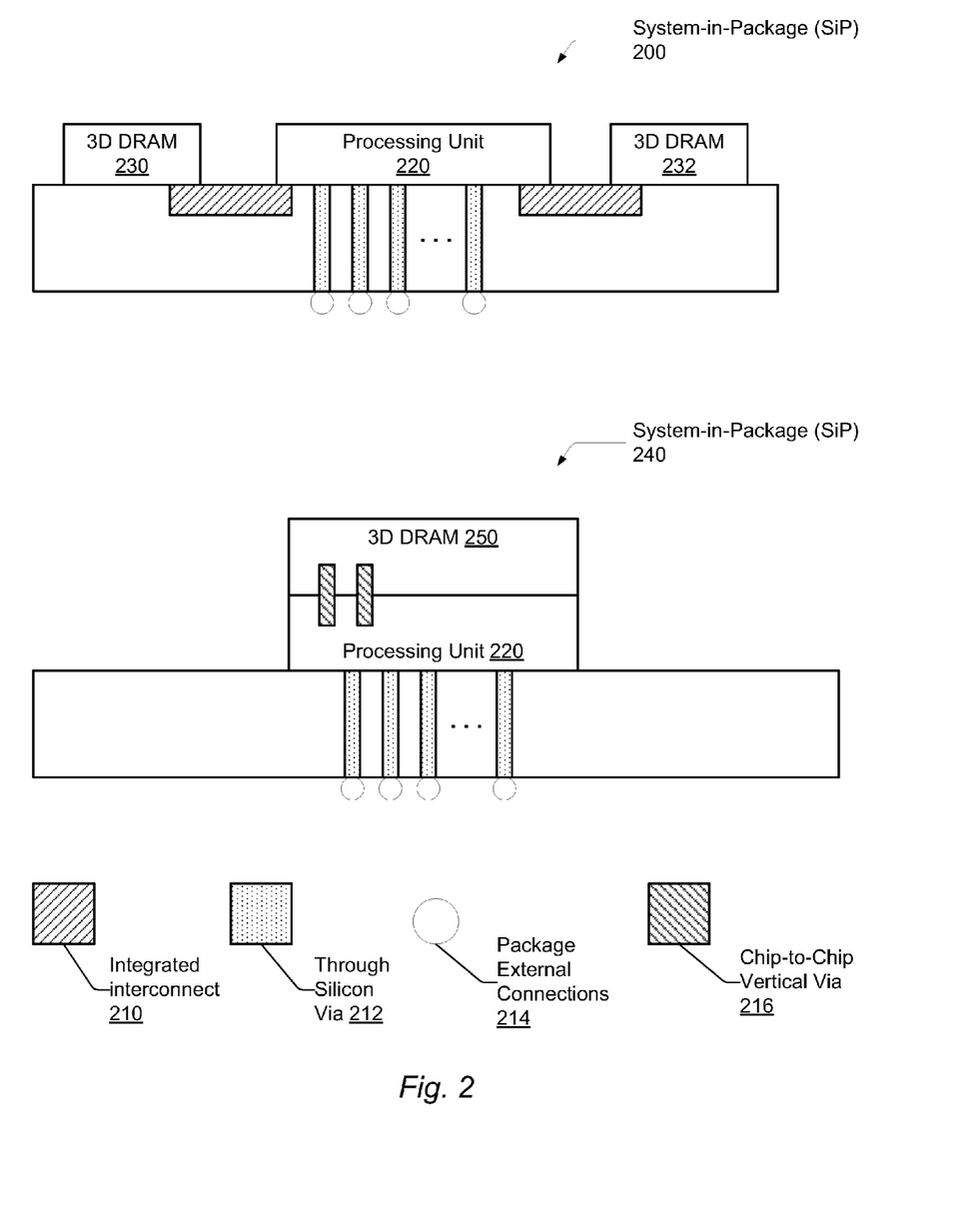
FIG. 2 is a generalized block diagram of embodiments of a system-in-package (SiP).

Turning now to FIG. 2, a generalized block diagram of embodiments of a system-in-package (SiP) 200 and 240 are shown. Three-dimensional (3D) packaging may be used within a computing system. This type of packaging may be referred to as a System in Package (SiP). A SiP includes one or more three-dimensional integrated circuits (3D ICs). A 3D IC includes two or more layers of active electronic components integrated both vertically and/or horizontally into a single circuit. In one embodiment, interposer-based integration may be used whereby the 3D IC may be placed next to the processing unit 220. Alternatively, a 3D IC may be stacked directly on top of another IC.

Die-stacking technology is a fabrication process that enables the physical stacking of multiple separate pieces of silicon (integrated chips) together in a same package with high-bandwidth and low-latency interconnects. The die may be stacked side by side on a silicon interposer, or vertically directly on top of each other. One configuration for the SiP is to stack one or more DRAM chips next to and/or on top of a processing unit. By stacking DRAM chips, a very large cache for the system may be realized for the processing unit. In one embodiment, this large cache may have a size on the order of several hundred MB (or more).

As shown, in one embodiment, the SiP 200 may include a processing unit 220 and one or more three-dimensional (3D) DRAM 230 and 232 that communicate with the processing unit 220 through horizontal low-latency interconnect 210. Again, the processing unit 220 may be a general-purpose CPU, which may also be referred to as a microprocessor; a graphics processing unit (GPU), an accelerated processing unit (APU), a field programmable gate array (FPGA), or other data processing device that makes use of a row-based memory, such as a cache.

The in-package horizontal low-latency interconnect 210 provides reduced lengths of interconnect signals versus long off-chip interconnects when a SiP is not used. The in-package horizontal low-latency interconnect 210 may use particular signals and protocols as if the chips, such as the processing unit 220 and the 3D DRAMs 230 and 232 were mounted in separate packages on a circuit board. The SiP 200 may additionally include backside vias or through-bulk silicon vias 212 that reach to package external connections 214. The package external connections 214 may be used for input/output (I/O) signals and power signals.

In another embodiment, the SiP 240 includes a 3D DRAM 250 stacked directly on top of the processing unit 220. Although not shown, for each of the SiP 200 and the SiP 240, multiple chips, or device layers, may be stacked on top of one another with direct vertical interconnects 216 tunneling through them. The size and density of the vertical interconnects 216 that can tunnel between the different device layers varies based on the underlying technology used to fabricate the 3D ICs.

Figure 3:
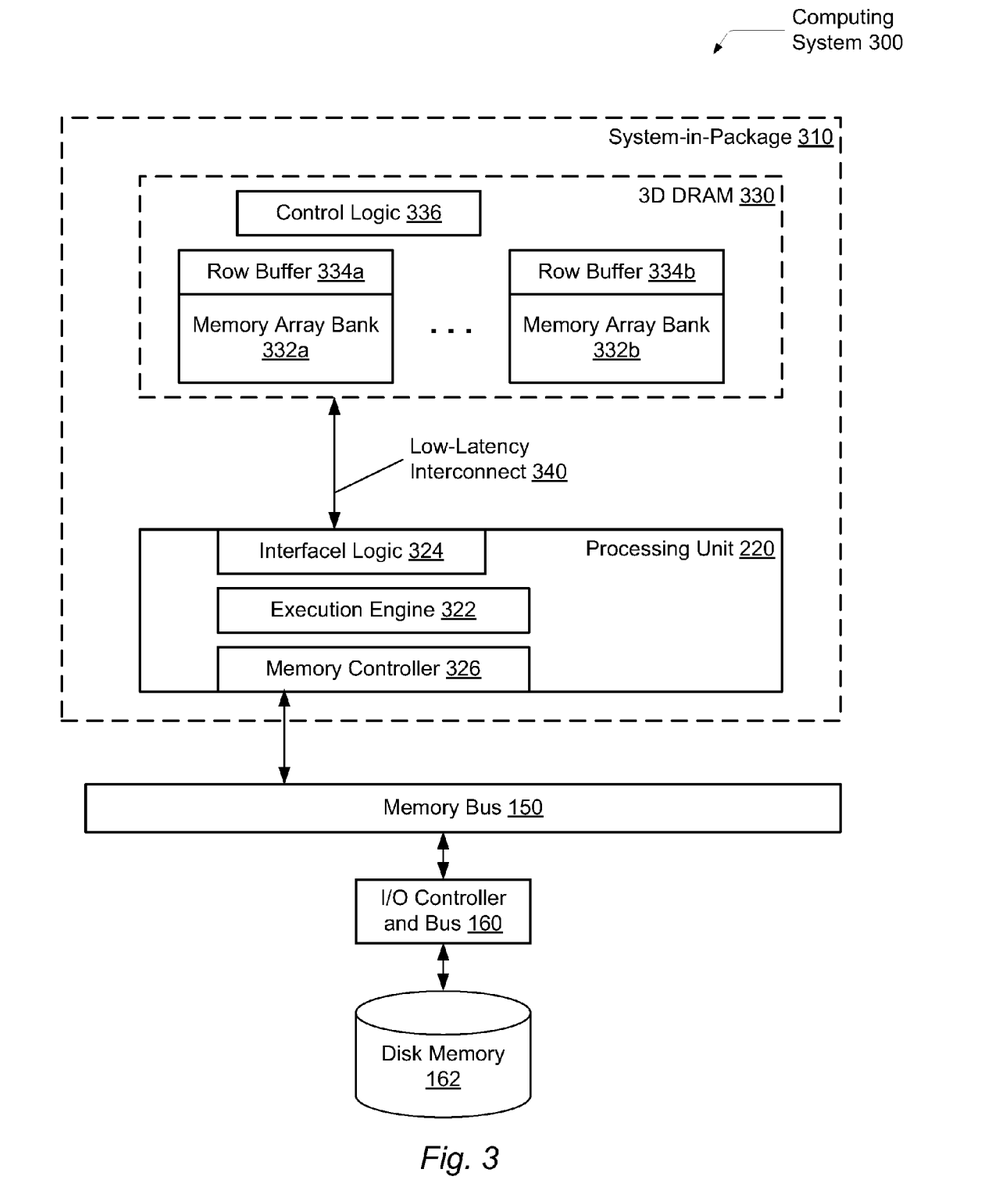
FIG. 3 is a generalized block diagram of another embodiment of a computing system.

Turning now to FIG. 3, a generalized block diagram of one embodiment of a computing system 300 utilizing a three-dimensional (3D) DRAM is shown. Circuitry and logic described earlier are numbered identically. The computing system 300 may utilize three-dimensional (3D) packaging, such as a System in Package (SiP) as described earlier. The computing system 300 may include a SiP 310. In one embodiment, the SiP 310 may include the processing unit 220 described earlier and a 3D DRAM 330 that communicate through low-latency interconnect 340. The in-package low-latency interconnect 340 may be horizontal and/or vertical with shorter lengths than long off-chip interconnects when a SiP is not used.

Although one embodiment of the SiP 310 is shown utilizing DRAM memory technology, other memory technologies that use a row-based access scheme including one or more row buffers or other equivalent structures are possible and contemplated. Examples of other memory technologies include phase-change memories, spin-torque-transfer resistive memories, memristors, and so forth.

The processing unit 220 may include an execution engine 322 for performing calculations and work for algorithms described by software applications. In one embodiment, the execution engine 322 may include one or more processor cores of a general-purpose CPU. In another embodiment, the execution engine 322 may include shaders, other graphics processing blocks and a single-instruction-multiple-data (SIMD) pipeline of a GPU to perform data-centric operations for at least graphics rendering and 3D graphics applications. Other examples of circuitry for data processing according to given algorithms are possible and contemplated.

The processing unit 220 may communicate with off-package memory, such as the disk memory 162 through the memory controller 326, the memory bus 150, and the I/O controller and bus 160. As shown, in one embodiment, the computing system 300 may not include off-package DRAM 170, which is included in the computing system 100 described earlier. The on-package 3D DRAM 330 may provide a very large on-package memory storage, which reduces a number of off-package memory accesses and hides long memory latencies. In another embodiment, the computing system 300 may still include the off-package DRAM 170.

The processing unit 220 may include interface logic to I/O devices and other processing units. This interface logic is not shown for ease of illustration. The processing unit 220 may also include the interface logic 324 for communicating with the 3D DRAM 330. Protocols, address formats, and interface signals used in this communication may be similar to the protocols, address formats and interface signals used for off-package DRAM 170. However, when the 3D DRAM 330 is used as a last-level cache (LLC), adjustments may be made to this communication. For example, a memory request sent from the processing unit 220 to the 3D DRAM 330 may include a cache tag in addition to a DRAM address identifying a respective row within one of the memory array banks 332a-332b. The received cache tag may be used to compare to cache tags stored in the identified given row within the 3D DRAM 330.

Similar to other DRAM topologies, the 3D DRAM 330 may include multiple memory array banks 332a-332b. Each one of the banks 332a-332b may include a respective one of the row buffers 334a-334b. Each one of the row buffers 334a-334b may store data in an accessed row of the multiple rows within the memory array banks 332a-332b. The accessed row may be identified by a DRAM address in the received memory request. The control logic 336 may perform tag comparisons between a cache tag in a received memory request and the one or more cache tags stored in the row buffer. In addition, the control logic may alter a column access of the row buffers by utilizing the cache tag comparison results rather than a bit field within the received DRAM address.

The control logic 336 may update metadata stored within the row buffer. The metadata may include at least a least recently used (LRU) value, a dirty bit, and a cache coherency value. The control logic 336 may synchronize the accesses of an identified row and the row buffer to change multiple DRAM transactions into a single, complex transaction. This single, complex transaction may perform activation and precharge of data and control lines within the 3D DRAM 330 once to access an identified row and once to put back the modified contents stored in the row buffer to the identified row. A further description follows.

Figure 4:
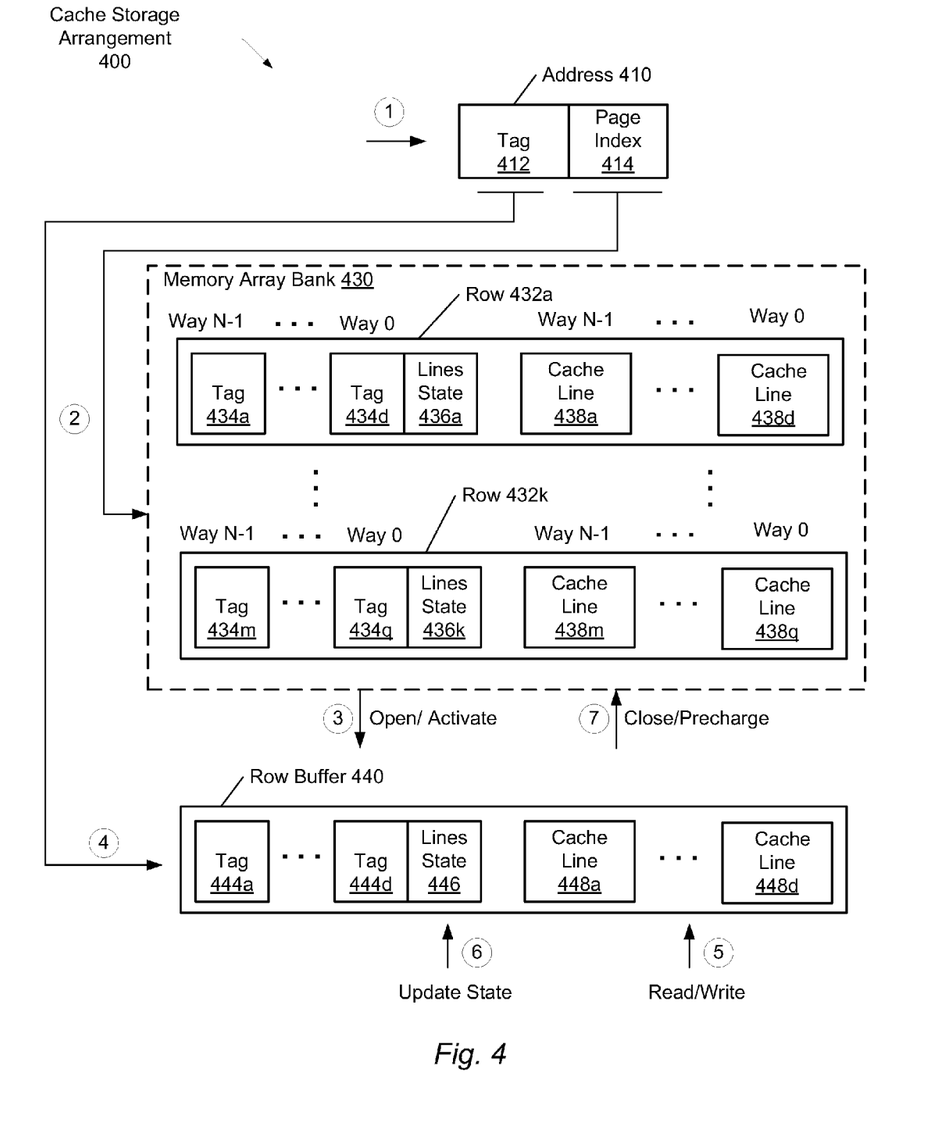
FIG. 4 is a generalized block diagram of one embodiment of sequence steps used to access a cache storage arrangement.

Referring now to FIG. 4, a generalized block diagram illustrating one embodiment of sequence steps used to access a cache storage arrangement 400 is shown. Data may be stored within a 3D DRAM in various manners. For example, each row within a given memory array bank may store data using a set-associative cache organization. The stored data may be partitioned into cache lines. Each row may also store cache tags corresponding to the cache lines within the same row. Further, each row may store metadata corresponding to a given cache line, such as replacement state, cache coherency state, a dirty bit, and so forth.

Although one embodiment of the cache storage arrangement 400 is described utilizing DRAM memory technology, other memory technologies that use a row-based access scheme including one or more row buffers or other equivalent structures are possible and contemplated. Examples of other memory technologies include phase-change memories, spin-torque-transfer resistive memories, memristors, and so forth.

A given one of one or more memory array banks within a 3D DRAM is shown in FIG. 4. The memory array bank 430 may include multiple rows 432a-432k. Each one of the rows 432a-432k may store cache tags and cache lines for an N-way set-associative cache organization, wherein N is an integer greater than one. A different number of ways, such as 8-way, 16-way, 32-way, or other, may be chosen. For example, row 432a stores cache tags in fields 434a-434d. The row 432a may store the data portion of corresponding cache lines in the fields 438a-438d. Therefore, the memory array bank 430 combines a tag array and a data array of a cache organization into a single physical structure. A portion of each row, such as fields 4343a-434d in row 432a, is used to hold the tag entries that correspond to the data elements stored in the remainder of the row, such as fields 438a-438d.

The tag storage in the rows 432a-432k of the memory array bank 430 may be a fixed fraction of the total size of the 3D DRAM. In one embodiment, the data portion of a cache line, or cache block, stores 64 bytes of data. Other sizes are possible and contemplated. However, the size of the cache line may not change due to the cache storage arrangement 400 used in the memory array bank 430. The cache storage arrangement 400 and sequence steps may allow the tag storage scale with the overall size of the 3D DRAM while allowing the cache line sizes remain the same, such as the 64-byte size. No on-chip SRAM storage may be utilized for tag storage within a processing unit.

In one embodiment, the memory array bank 430 utilizes a 30-way set-associative cache organization. Each one of the rows 432a-432k may have sufficient space to store 32 ways, but 2 of the ways may be utilized for storing corresponding cache tag information. In one example, a cache line is 64 bytes and a cache tag is 4 bytes. In this example, 2 cache lines provides 2 lines×64 bytes=128 bytes of storage. In this example, the tag storage is placed in the space typically occupied by two cache lines. For 30 cache lines, the tag storage utilizes 30 ways×4 bytes=120 bytes. The extra 8 bytes may be used to store additional metadata, such as additional information to improve replacement decisions, prefetch hints, profiling data, dirty bits, cache coherency state, and so forth.

Each row of the rows 432a-432k may store metadata corresponding to the stored cache lines. For example, the row 432a stores the state metadata in field 436a. The stored metadata may include at least at least one or more of the following for each corresponding cache line: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, invalid, or other; a dirty bit, prefetch hint information, profiling data, and so forth. Other types of state information are possible and contemplated.

Continuing with the stored information in the rows of the memory array bank 430, the row 432k may store information in a similar format as the row 432a. For example, the row 432k may store tags in fields 434m-434q, state metadata in field 436k, and the data portion of corresponding cache lines in fields 438m-438q. It is noted that although the information stored in the rows 432a-432k are shown in a particular order and in contiguous space, other placements for data storage whether contiguous or not are possible and contemplated. A particular storage arrangement may be selected based on design tradeoffs.

The row buffer 440 may store data and metadata read out from a selected one of the rows 432a-432k. The row buffer 440 may use a similar storage arrangement as the rows 432a-432k. For example, the row buffer 440 may store cache tag information for N ways of a set-associative cache organization in fields 444a-444d. The row buffer 440 may store the data portion of corresponding cache lines in fields 448a-448d. The row buffer 440 may store status information, such as the corresponding state metadata, in field 446.

In one example, a cache line is 64 bytes, a cache tag is 4 bytes, and the memory array bank 430 utilizes a 30-way set-associative cache organization. Each one of the rows 432a-432k may utilize 2 ways for tag storage and 30 ways for data storage. The 2 ways may also include metadata storage. Therefore, each one of the rows 432a-432k includes 32 ways×64 bytes/way=2,048 bytes, or 2 kilo-bytes (KB) of storage. Similarly, the row buffer 440 includes 2 KB of storage. Each one of the rows 432a-432k may utilize DRAM memory technology for information storage. However, the row buffer 440 may utilize registers, SRAM cells or other storage mechanisms. Therefore, repeated access of the row buffer 440 may be more efficient than repeated access of any one of the rows 432a-432k.

A 3D DRAM may store a very large, in-package memory storage for a corresponding processing unit. This large memory storage may be used as a last-level cache. In one embodiment, the data portion of a cache line, or cache block, stores 64 bytes of data. Other sizes are possible and contemplated. A 3D DRAM may have a size of at least several hundred megabytes (MB) or larger. The memory array bank 430 may be one bank of multiple banks within a 3D DRAM. In one example, the 3D DRAM has a size of 512 MB, which may store 8,388,608 individual 64-byte cache lines. A corresponding cache tag may have a size of 4 to 8 bytes. For a 4-byte cache tag, a corresponding tag array has a size of 8,388,608×4 bytes=32 MB. Such a large tag array may not be feasibly stored in an on-chip SRAM in the processing unit. Rather, this large tag array may be stored within the 3D DRAM as shown in FIG. 4.

A sequence of steps 1-7 is shown in FIG. 4 for accessing tags, status information and data corresponding to cache lines stored in a 3D DRAM. When the memory array bank 430 is used as a cache storing both a tag array and a data array within a same row, an access sequence different from a sequence utilizing steps 1-7 for a given row of the rows 432a-432k may have a large latency. For example, a DRAM access typically includes an first activation or opening stage, a stage that copies the contents of an entire row into the row buffer, a tag read stage, a tag comparison stage, a data read or write access stage that includes a column access, a first precharge or closing stage, a second activation or opening stage, a stage that copies the contents of the entire row again into the row buffer, a tag read stage, a tag comparison stage, an update stage for status information corresponding to the matching tag, and a second precharge or closing stage.

Continuing with the access steps within the memory array bank 430, one or more additional precharge and activation stages may be included after each access of the row buffer if other data stored in other rows are accessed in the meantime. Rather than utilize multiple DRAM transactions for a single cache access, the sequence of steps 1-7, may be used to convert a cache access into a single DRAM transaction. Each of the different DRAM operations, such as activation/open, column access, read, write, and precharge/close, has a different respective latency. The activation and precharge operations often have significantly higher latencies than the read and write operations. Therefore, the sequence of steps 1-7 used to create a single, complex transaction may reduce a number of the individual activation and precharge operations.

During sequence 1, a memory request from a processing unit may be received by a 3D DRAM. The memory request may have traversed horizontal or vertical short low-latency interconnect routes available through a 3D integrated fabrication process. A portion of a complete address is shown as address 410. The fields 412 and 414 may store a cache tag and a page index, respectively. Other portions of the complete address may include one or more of a channel index, a bank index, a sub array index, and so forth to identify the memory array bank 430 within the 3D DRAM. During sequence 2, a given row of the rows 432a-432k may be selected from other rows by the page index 414.

During sequence 3, an activation or opening stage is executed to copy the entire contents of a selected one of the rows 432a-432k into the row buffer 440. Reading the selected one of the rows 432a-432k in a 3D DRAM, or generally in a DRAM, is a "destructive" operation. A copy of the entire contents of the selected row is kept in the row buffer 440. This process of reading data from a row of the memory array bank 430 into the row buffer is called "activation" or "opening". When data from a different row is to be accessed, the contents of the row buffer 440 may be "precharged" or "closed", which places the current values of the data stored in the row buffer 440 back into the memory array bank 430.

A cache tag may be used to determine which of the multiple cache lines are being accessed within a selected row. For example, in a 30-way set-associative cache organization, when the row 432a is selected, the cache tag values stored in the fields 434a-434d may be used to determine which one of the 30 cache lines stored in fields 438a-438d is being accessed. The cache tag stored in field 412 within the address 410 may be used in comparison logic to locate a corresponding cache line of the multiple cache lines stored in the row buffer 440.

During sequence 4, a cache line hit may occur when the cache tag value stored in field 412 matches a cache tag value stored in one of the fields 444a-444d in the row buffer 440 and a corresponding cache line state stored in the field 446 indicates a corresponding cache line is a valid cache line. In one embodiment, this tag comparison operation may read each of the stored cache tags in fields 444a-444d in a single continuous burst. In one example, the cache tags are stored in an amount of space equivalent to 2 cache lines as described in earlier examples. These 2 cache lines worth of information may be read from the row buffer 440 in a single operation. Following, comparison logic may compare each of the read-out cache tags from the fields 444a-444d to the cache tag value stored in field 412.

In another embodiment, one or more bits from the received address may select a subgroup of the cache tags stored in fields 444a-444d for the tag comparison logic. If a tag match is determined, then subsequent steps of the 3D DRAM access may proceed. If a match is not determined to occur, then another subgroup different from the first subgroup of the cache tags stored in fields 444a-444d may be selected for the tag comparison logic. This mechanism may be generalized to more than two subgroups. This mechanism may reduce a total amount of read operations and/or a total aggregate burst length and/or bus occupancy used for tag comparisons.

During sequence 5, a given one of the multiple cache lines stored in the row buffer 440 is selected based on the tag comparison result. This column access is based on information stored in the received address and stored in the row buffer 440, such as the cache tags in fields 444a-444d and in the cache line state information stored in the field 446. The selected given cache line is read or written based on the received memory request. In one embodiment, an offset value may be stored in the received address and may be used to indicate a specific byte or word within the selected cache line to be accessed. The read or write operations operate directly on contents stored in the row buffer 440.

During sequence 6, the state information stored in field 446 corresponding to the selected cache line is updated. For example, a cache coherency state may have changed, a LRU replacement state may have changed, a cache block owner identifier (ID) may have changed, both prefetch hint information and profiling data may have changed, and so forth. Again, the update operation may operate directly on the contents stored in the row buffer 440. During sequence 7, a precharge or closing stage is executed to copy the entire contents of the row buffer 440 back into the selected one of the rows 432a-432k. Some of the contents within the row buffer 440 are now modified, such as at least the state information and a give one of the cache lines.

Control logic, such as control logic 336 shown in FIG. 3, may ensure the operations performed in sequences 3-7 occur as a block of uninterrupted operations. For example, once the open operations begin in sequence 3, other memory requests that are waiting to operate on data within the memory array bank 430 may be directed to continue to wait by the control logic until the sequences 3-7 have completed. This single, complex access of the 3D DRAM avoids additional high-cost activation and precharge latencies. This single, complex access of the 3D DRAM may maintain the latency of an access corresponding to a single memory request to a single activation latency, a single precharge latency, a single read/write operation performed on a cache line, a single write operation for updating state information, and the latency for the tag read and comparisons.

Figure 5:
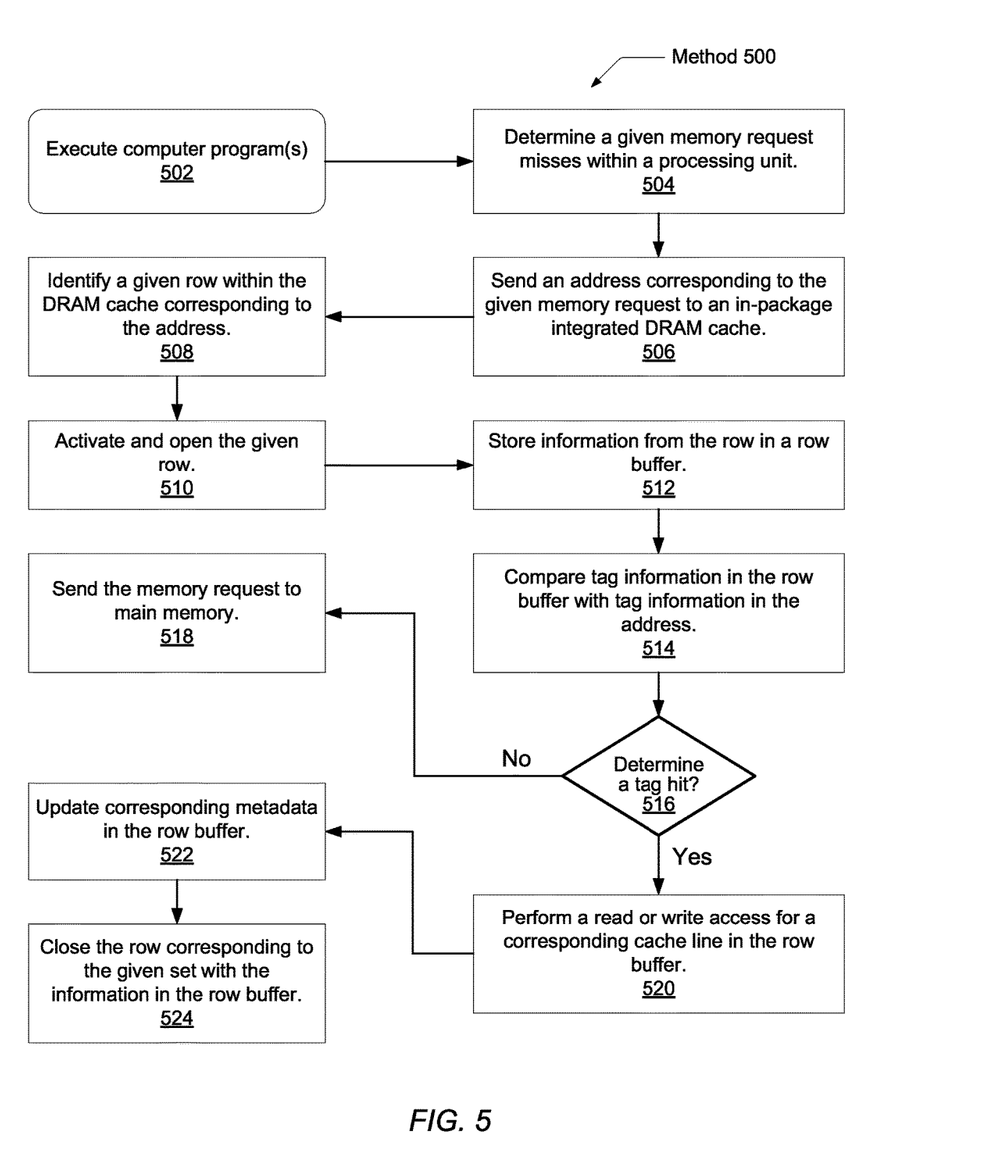
FIG. 5 is a generalized flow diagram of one embodiment of a method for efficient in-package DRAM access.

Referring now to FIG. 5, a generalized flow diagram of one embodiment of a method 500 for efficient in-package DRAM access is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

One or more computer programs, or software applications, execute in block 502. A processing unit may execute these applications. Examples of a processing unit are given earlier. The processing unit may be within a System-in-Package (SiP) that also includes a 3D integrated memory, such as a 3D DRAM. The processing unit may utilize the 3D DRAM as a cache.

In block 504, the processing unit may determine a given memory request misses within a cache memory subsystem within the processing unit. In block 506, the processing unit may send an address corresponding to the given memory request to an in-package integrated DRAM cache, such as the 3D DRAM. The address may include a non-translated cache tag in addition to a DRAM address translated from a corresponding cache address used within the processing unit to access on-chip caches. In block 508, control logic within the 3D DRAM may identify a given row corresponding to the address within the memory array banks in the 3D DRAM.

In block 510, control logic within the 3D DRAM may activate and open the given row. In block 512, the contents of the given row may be copied and stored in a row buffer. In block 514, the tag information in the row buffer may be compared with tag information in the address. The steps described in blocks 506-512 may correspond to the sequences 1-4 described earlier regarding FIG. 4.

If the tag comparisons determine a tag hit does not occur (conditional block 516), then in block 518, the memory request may be sent to main memory. The main memory may include an off-chip non-integrated DRAM and/or an off-chip disk memory. If the tag comparisons determine a tag hit occurs (conditional block 516), then in block 520, read or write operations are performed on a corresponding cache line in the row buffer.

In block 522, corresponding metadata in the row buffer that stores state information for the cache line are updated. In block 524, both modified and unmodified information stored in the row buffer is copied back to the given row. A precharge and closing stage is performed to move the data.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    storing in a same row of a plurality of rows in a dynamic random access memory (DRAM) at least one or more cache tags and one or more cache lines indicated by the one or more cache tags;
    receiving a memory request from a processing unit coupled to the DRAM; and
    in response to receiving the memory request, performing a memory access according to the received memory request on a given cache line indicated by a first cache tag within the received memory request, wherein performing the memory access comprises:
        performing a single read of a respective row of the plurality of rows, wherein the respective row stores a plurality of cache tags and a plurality of cache lines;
        copying said plurality of cache tags and said plurality of cache lines from the respective row to a row buffer prior to comparing the first cache tag to the plurality of cache tags stored in the respective row; and
        comparing a cache tag in the received memory request to the plurality of cache tags in the respective row.

2. The method as recited in claim 1, further comprising determining the first cache tag within the received memory request matches a second cache tag of the one or more cache tags stored in the respective row.

3. The method as recited in claim 2, wherein a position of the second cache tag within the respective row indicates a position of the given cache line within the respective row.

4. The method as recited in claim 3, further comprising control logic within the DRAM comparing a cache tag in the received memory request to the plurality of cache tags in the respective row.

5. The method as recited in claim 1, wherein performing the memory access comprises performing the following operations as a block of uninterrupted operations:
    performing a DRAM opening stage for the respective row;
    storing the plurality of cache tags and the plurality of cache lines in the row buffer;
    copying back any data modified by the memory access and data unmodified by the memory access to the respective row; and
    performing a DRAM closing stage for the respective row.

6. The method as recited in claim 3, wherein performing the memory access includes a single DRAM closing stage for the respective row.

7. The method as recited in claim 3, wherein said plurality of cache tags and plurality of cache lines of the respective row are combined into a single physical structure.

8. The method as recited in claim 6, wherein the processing unit is at least one of the following: a general-purpose microprocessor, a graphics processing unit (GPU), an accelerated processing unit (APU) and a field programmable gate array (FPGA).

9. A dynamic random access memory (DRAM) comprising:
    a plurality of rows, wherein each row is configured to store at least (i) a plurality of cache tags and (ii) a plurality of cache lines indicated by the plurality of cache tags; and
    control circuitry configured to:
        receive a memory request; and
        in response to receiving the memory request, perform a memory access according to the received memory request on a given cache line indicated by a first cache tag within the received memory request, wherein performing the memory access comprises:
            performing a single read of a respective row of the plurality of rows, wherein the respective row stores a plurality of cache tags and a plurality of cache lines;
            copying said plurality of cache tags and said plurality of cache lines from the respective row to a row buffer prior to comparing the first cache tag to the plurality of cache tags stored in the respective row; and
            comparing a cache tag in the received memory request to the plurality of cache tags in the respective row.

10. The DRAM as recited in claim 9, wherein the control circuitry is further configured to determine the first cache tag within the received memory request matches a second cache tag of the plurality of cache tags stored in the respective row.

11. The DRAM as recited in claim 10, wherein each one of the plurality of rows is further configured to store metadata corresponding to the plurality of cache tags, wherein performing the memory access with a single read of the respective row storing the given cache line includes updating the metadata based on the memory access.

12. The DRAM as recited in claim 9, wherein to perform the memory access, the DRAM is configured to perform the following operations as a block of uninterrupted operations:
    perform a DRAM opening stage for the respective row;
    store the plurality of cache tags and the plurality of cache lines in the row buffer;

copy back any data modified by the memory access and data unmodified by the memory access to the respective row; and perform a DRAM closing stage for the respective row.

13. A system in package (SIP) comprising:

a processing unit on a first chip configured to generate memory requests; and a dynamic random access memory (DRAM) on a second chip comprising a plurality of rows, wherein the DRAM is coupled to the first chip and is configured to:

store in a same row of the plurality of rows at least a plurality of cache tags and a plurality of cache lines indicated by the plurality of cache tags;

receive a memory request from the processing unit; and perform a memory access according to the received memory request on a given cache line indicated by a first cache tag within the received memory request, wherein performing the memory access comprises:

performing a single read of a respective row of the plurality of rows, wherein the respective row stores a plurality of cache tags and a plurality of cache lines;

copying said plurality of cache tags and said plurality of cache lines from the respective row to a row buffer prior to comparing the first cache tag to the plurality of cache tags stored in the respective row;

wherein to perform the memory access, the DRAM is configured to perform the following operations as a block of uninterrupted operations:

perform a DRAM opening stage for the respective row;

store the plurality of cache tags and the plurality of cache lines in the row buffer;

copy back any data modified by the memory access and data unmodified by the memory access to the respective row; and perform a DRAM closing stage for the respective row.

14. The system as recited in claim 13, wherein the DRAM is further configured to determine the first cache tag within the received memory request matches a second cache tag of the plurality of cache tags stored in the respective row.

15. The system as recited in claim 13, wherein a position of the second cache tag within the respective row indicates a position of the given cache line within the respective row.

16. The system as recited in claim 13, wherein the DRAM comprises control logic configured to compare a cache tag in the received memory request to the plurality of cache tags in the respective row.

17. The system as recited in claim 16, wherein performing the memory access with a single read of the respective row storing the given cache line includes updating the metadata based on the memory access.

18. The system as recited in claim 13, wherein said plurality of cache tags and plurality of cache lines of the respective row are combined into a single physical structure.

19. The system as recited in claim 13, wherein the plurality of cache tags and the plurality of cache lines are stored in a given bank of the memory array, and once the memory access begins, other memory requests that are waiting to operate on data in the given bank are directed to wait until the memory access is completed.

* * * * *